United States Patent
Mueller-Tamm et al.

[15] 3,655,504
[45] Apr. 11, 1972

[54] LAMINATED METAL PLATES

[72] Inventors: Heinz Mueller-Tamm, Ludwigshafen; Alfred Hofmann, Roxheim, both of Germany

[73] Assignee: Badische Anilin- & Soda-Fabrik Aktiengesellschaft, Ludwigshafen Rhine, Germany

[22] Filed: May 19, 1969

[21] Appl. No.: 825,929

[30] Foreign Application Priority Data

May 24, 1968 Germany............................P 17 69 434.7

[52] U.S. Cl..............................161/165, 161/214, 161/218, 260/80.8
[51] Int. Cl......................................................B32b 15/08
[58] Field of Search......................161/165, 216, 218, 214; 260/80.8, 80.81

[56] References Cited

UNITED STATES PATENTS

| | | | |
|---|---|---|---|
| 3,201,374 | 8/1965 | Simms | 260/80.8 |
| 3,249,570 | 5/1966 | Potts et al. | 260/80.8 |
| 3,312,676 | 4/1967 | Rees | 260/80.81 |
| 3,352,742 | 11/1967 | Zunich et al. | 161/216 |
| 3,382,136 | 5/1968 | Bugel et al. | 161/216 |
| 3,455,775 | 7/1969 | Pohl et al. | 161/217 |
| 3,475,240 | 10/1969 | Manaka et al. | 161/214 |
| 3,481,812 | 12/1969 | Holub et al. | 161/216 |

*Primary Examiner*—John T. Goolkasian
*Attorney*—Johnston, Root, O'Keeffe, Keil, Thompson & Shurtleff

[57] ABSTRACT

Laminated metal plates made of (1) an outer layer of a metal, (2) an intermediate layer of a polymer, (3) an inner layer of a metal, (4) an intermediate layer of a polymer and (5) an outer layer of a metal. It is a characteristic of the invention that the polymer of layers (2) and (4) is a special terpolymer.

1 Claim, No Drawings

LAMINATED METAL PLATES

The present invention relates to laminated metal plates made up of:

1. an outer layer of metal having a thickness of from 0.005 to 0.5 mm;
2. an intermediate layer of a thermoplastic polymer having a thickness of from 0.02 to 1.5 mm;
3. an inner layer of a metal having a thickness of from 0.3 to 4 mm;
4. an intermediate layer of a thermoplastic polymer having a thickness of from 0.02 to 1.5 mm; and
5. an outer layer of a metal having a thickness of from 0.005 to 0.5 mm.

Known metal plates of this type generally contain as the intermediate layers (2) and (4) of a thermoplastic polymer layers of a polyamide, polyester or copolymer of ethylene and vinyl acetate, acting as a hot-melt adhesive. The individual layers of these plates have a fairly good resistance to peeling with respect to each other, but a relatively poor resistance to tensile shear stress.

Moreover, laminated metal plates are known which contain as the intermediate layers (2) and (4) adhesives known as contact adhesives, for example those based on polyisobutylene, polyacrylic esters or natural rubber, i.e. polymeric substances which at room temperature are permanently plastic and adhere very well to metals. These plates have not only the abovementioned disadvantage of fairly poor resistance to tensile shear stress but also the disadvantage that their creep rupture strength and resistance to high temperature leave much to be desired.

Furthermore, laminated metal plates are known having fairly good resistance to tensile shear stress, relatively good creep rupture strength and fairly good resistance to high temperatures. In these plates the intermediate layers (2) and (4) consist of an adhesive known as a two-component adhesive, i.e. generally an epoxide resin, polyester resin or polyurethane resin. It is a disadvantage of these plates that they have a relatively poor resistance to peeling.

The object of the present invention is to provide laminated metal plates of the abovementioned type which do not have the abovementioned disadvantages or have them to a considerably smaller extent.

We have found that this object is achieved when the intermediate layers (2) and (4) consist of a special thermoplastic terpolymer.

The present invention accordingly consists in a laminated metal plate made up of:

1. an outer layer of metal having a thickness of from 0.005 to 0.5 mm;
2. an intermediate layer of a thermoplastic polymer having a thickness of 0.02 to 1.5 mm;
3. an inner layer of a metal having a thickness of 0.3 to 4 mm;
4. an intermediate layer of a thermoplastic polymer having a thickness of from 0.01 to 1.5 mm; and
5. an outer layer of a metal having a thickness of from 0.005 to 0.5 mm.

The metal plates according to this invention are characterized by the fact that the thermoplastic polymer of layer (2) and layer (4) is a terpolymer consisting of 60 to 90 percent by weight of ethylene units, 0.5 to 20 percent by weight of units of an ethylenically unsaturated carboxylic acid and 0.5 to 20 percent by weight of units of an ester of an ethylenically unsaturated carboxylic acid.

It has been found that the metal plates in accordance with this invention have particularly favorable properties when the thermoplastic polymer of the layers (2) and (4) is a terpolymer consisting of 71 to 90 percent by weight of ethylene units, 3 to 9 percent by weight of units of an aliphatic ethylenically unsaturated $C_3$ to $C_5$ carboxylic acid, and 1 to 20 percent by weight of units of a $C_1$ to $C_8$ alkyl ester of an aliphatic ethylenically unsaturated $C_3$ to $C_5$ carboxylic acid.

It has been found that the favorable properties of metal plates according to this invention are especially evident when the thermoplastic polymer of the layers (2) and (4) is a terpolymer consisting of 71 to 90 percent by weight of ethylene units, 3 to 9 percent by weight of acrylic acid units and 1 to 20 percent by weight of tertiary-butyl acrylate units.

The outer metal layers (1) and (5) for the plates in accordance with this invention may be layers (foil or sheeting) of the conventional metals, particularly of copper, brass and stainless steel. Layers of precious metals such as silver and gold may also be used because the layers in question do not have any load-bearing or stiffening function and may therefore be of any thinness. The metal layers (1) and (5) in the plates according to this invention may be of equal or different thickness and may consist of the same or different metals.

The terpolymers to be used in accordance with this invention for the intermediate layers (2) and (4) are known as such from polymer chemistry. They should advantageously have the following characteristic data: density from 0.9 to 1.1 $g/cm^3$; crystalline fraction less than 60 percent; Shore Hardness C from 50 to 90. In the metal plates, the terpolymers of layers (2) and (4) may be identical or different in their composition. The terpolymers are advantageously used in the form of film or sheeting. Since they act as a kind of thermoplastic adhesive, they should be present during processing (i. E. in the manufacture of the metal plates) in the plastic to viscous condition. They are used at temperatures of from 80° to 250° C., particularly from 130° to 220° C.

The inner metal layer (3) may be a layer (sheet) of a conventional metal, particularly aluminum or steel. The thickness of this layer should preferably be such that it determines to a predominant extent the desired flexural stiffness or dimensional stability of the metal plate.

The production of the plates according to this invention may be carried out by conventional methods, for example by placing in a press, one above the other, a metal foil or sheet (to form layer (1)), a film or sheet of the terpolymer (to form layer (2)), a sheet of metal (to form layer (3)), a film or sheet of the terpolymer (to form layer (4)) and a metal foil or sheet (to form layer (5)), after which pressure is applied at elevated temperature.

The laminated metal plates obtained are suitable for example as exterior wall panels and as structural or decorative elements in automobile, ship and machine construction.

The invention is illustrated by the following Example.

EXAMPLE

A copper foil having a thickness of 0.1 mm (to form layer (1)) is laid in a press, and a film having a thickness of 0.2 mm and consisting of a terpolymer containing 88.3 percent by weight of ethylene units, 3.5 percent by weight of acrylic acid units and 8.2 percent by weight of tertiary-butyl acrylate units (to form layer (2)) is laid on the copper foil. A steel sheet having a thickness of 2.2 mm (to form layer (3)) is then laid on, followed by a 1 mm thick sheet of a terpolymer containing 81.1 percent by weight of ethylene units, 17.6 percent by weight of acrylic acid units and 1.3 percent by weight of tertiary-butyl acrylate units (to form layer (4)). Then a copper foil having a thickness of 0.1 mm (to form layer (5)) is laid on and the whole is pressed at a temperature of 190° C. and a pressure of 0.15 $g/cm^2$ for 5 minutes to form a laminate. The laminated metal plate obtained is removed from the press at a temperature of 70° C. and allowed to cool to room temperature without any pressure being applied.

We claim:

1. A laminated plate made up of:
1. an outer layer of copper, brass, stainless steel, silver or gold having a thickness of from 0.005 to 0.5 mm;
2. an intermediate layer of a thermoplastic polymer having a thickness of from 0.02 to 1.5 mm;
3. an inner layer of aluminum or steel having a thickness of 0.3 to 4 mm;
4. an intermediate layer of a thermoplastic polymer having a thickness of from 0.01 to 1.5 mm; and 5. an outer layer of copper, brass, stainless steel, silver or gold having a thickness from 0.005 to 0.5 mm, wherein the thermoplastic polymer of layer (2) and layer (4) is a terpolymer consisting of 60 to 90 percent by weight of ethylene units, 0.5 to 20 percent by weight of acrylic acid units, and 0.5 to 20 percent by weight of tertiary-butyl acrylate units.

* * * * *